(12) United States Patent
Gupta et al.

(10) Patent No.: US 10,621,617 B2
(45) Date of Patent: Apr. 14, 2020

(54) PROVIDING ON-DEMAND AUDIENCE BASED ON NETWORK

(71) Applicant: Verizon Patent and Licensing Inc., Arlington, VA (US)

(72) Inventors: Gaurav Gupta, Fremont, CA (US); Manish Sharma, San Jose, CA (US); Devin Blong, Penngrove, CA (US); Kevin Flores, San Jose, CA (US); Tushar Chaudhary, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 15/142,382

(22) Filed: Apr. 29, 2016

(65) Prior Publication Data

US 2016/0239866 A1 Aug. 18, 2016

Related U.S. Application Data

(63) Continuation of application No. 14/465,377, filed on Aug. 21, 2014, now Pat. No. 9,396,480.

(51) Int. Cl.
*H04N 7/025* (2006.01)
*G06Q 30/02* (2012.01)
(Continued)

(52) U.S. Cl.
CPC ......... *G06Q 30/0254* (2013.01); *G06F 16/33* (2019.01); *G06Q 30/0224* (2013.01);
(Continued)

(58) Field of Classification Search
CPC ........ G06F 17/30867; G06F 17/30699; G06Q 10/02; G06Q 10/063114; G06Q 20/3224; G06Q 30/02; G06Q 30/0269; G06Q 30/0255; G06Q 30/0251; G06Q 30/0241; G06Q 30/0224; G06Q 30/0261; G06Q 30/0267; G06Q 30/0625; G06Q 30/0202;
(Continued)

(56) References Cited

U.S. PATENT DOCUMENTS 7,043,255 B1 5/2006 Tiwari
7,133,845 B1 * 11/2006 Ginter .................... G06F 21/10
705/51
(Continued)

*Primary Examiner* — Pankaj Kumar
*Assistant Examiner* — Sahar Aqil Riaz

(57) ABSTRACT

A device receives, from a client device, a first request associated with target audience criteria and a time constraint. Based on the target audience criteria, the device sends, to an information device, a network state request. In response to the network state request, the device receives, from the information device, a network state response including user data associated with user devices. Based on the network state response, the device determines a predicted network state, including predicted user data associated with the user devices, associated with the time constraint. Based on the predicted network state and the target audience criteria, the device determines a predicted quantity of user devices associated with both the target audience criteria and the time constraint. The device sends, to the client device, a first response based on the determination of the predicted quantity of user devices.

20 Claims, 8 Drawing Sheets

(51) Int. Cl.
  *G06F 16/33* (2019.01)
  *H04N 21/25* (2011.01)
  *H04N 21/2547* (2011.01)
  *H04N 21/258* (2011.01)
  *H04N 21/442* (2011.01)
  *H04N 21/45* (2011.01)
  *H04N 21/466* (2011.01)
  *H04N 21/472* (2011.01)
  *H04N 21/81* (2011.01)
  *H04L 29/08* (2006.01)

(52) U.S. Cl.
  CPC ..... *G06Q 30/0235* (2013.01); *G06Q 30/0264* (2013.01); *H04N 21/252* (2013.01); *H04N 21/2547* (2013.01); *H04N 21/25891* (2013.01); *H04N 21/44204* (2013.01); *H04N 21/4532* (2013.01); *H04N 21/4667* (2013.01); *H04N 21/47202* (2013.01); *H04N 21/812* (2013.01); *H04L 67/22* (2013.01)

(58) Field of Classification Search
  CPC ........... G06Q 30/0206; G06Q 30/0276; G06Q 30/0279; G06Q 50/188; G06Q 30/0249; G06Q 30/0205; G06Q 30/0259; G06Q 30/32; G06Q 30/0283; G06Q 30/0254; G06Q 30/0235; G06Q 30/0264; H04L 67/22; H04L 67/20; H04L 67/18; H04N 21/812; H04N 21/4532
  See application file for complete search history.

(56) References Cited

U.S. PATENT DOCUMENTS

| | | | | | |
|---|---|---|---|---|---|
| 7,873,638 | B2* | 1/2011 | Young | | H04H 60/06 |
| | | | | | 375/240.1 |
| 8,046,313 | B2* | 10/2011 | Hoffberg | | G06F 3/0482 |
| | | | | | 706/14 |
| 8,099,327 | B2* | 1/2012 | Steelberg | | G06Q 30/0273 |
| | | | | | 705/14.69 |
| 9,264,151 | B1* | 2/2016 | Emigh | | G06Q 30/0211 |
| 2003/0037110 | A1* | 2/2003 | Yamamoto | | H04M 3/5322 |
| | | | | | 709/204 |
| 2003/0041050 | A1 | 2/2003 | Smith et al. | | |
| 2004/0260605 | A1* | 12/2004 | McIntyre | | G06Q 30/02 |
| | | | | | 705/14.39 |
| 2005/0010472 | A1* | 1/2005 | Quatse | | G06Q 30/02 |
| | | | | | 705/14.13 |
| 2005/0021397 | A1* | 1/2005 | Cui | | G06Q 30/02 |
| | | | | | 705/14.42 |
| 2005/0131797 | A1 | 6/2005 | Ananthanarayanan et al. | | |
| 2006/0155598 | A1 | 7/2006 | Spurr | | |
| 2006/0200253 | A1* | 9/2006 | Hoffberg | | G05B 15/02 |
| | | | | | 700/19 |
| 2006/0293951 | A1* | 12/2006 | Patel | | G06Q 30/02 |
| | | | | | 705/14.1 |
| 2007/0156726 | A1* | 7/2007 | Levy | | G06F 21/10 |
| 2007/0157228 | A1* | 7/2007 | Bayer | | G06Q 30/02 |
| | | | | | 725/34 |
| 2008/0208787 | A1* | 8/2008 | Luchene | | G06N 5/025 |
| | | | | | 706/47 |
| 2010/0093333 | A1* | 4/2010 | Friedenthal | | G06Q 30/02 |
| | | | | | 455/418 |
| 2010/0094878 | A1 | 4/2010 | Soroca et al. | | |
| 2010/0191598 | A1 | 7/2010 | Toennis et al. | | |
| 2010/0250370 | A1* | 9/2010 | Jones | | G06Q 10/06 |
| | | | | | 705/14.66 |
| 2010/0262449 | A1* | 10/2010 | Monteforte | | G06Q 30/02 |
| | | | | | 705/7.34 |
| 2010/0262487 | A1* | 10/2010 | Edwards | | G06Q 30/02 |
| | | | | | 705/14.43 |
| 2011/0029373 | A1* | 2/2011 | Steelberg | | G06Q 30/02 |
| | | | | | 705/14.41 |
| 2012/0023522 | A1* | 1/2012 | Anderson | | G06Q 30/02 |
| | | | | | 725/35 |
| 2012/0136704 | A1* | 5/2012 | Carlson | | G06Q 30/02 |
| | | | | | 705/14.17 |
| 2012/0150605 | A1* | 6/2012 | Isaacson | | G06Q 20/10 |
| | | | | | 705/14.25 |
| 2012/0245989 | A1* | 9/2012 | Kakarla | | G06Q 20/00 |
| | | | | | 705/14.25 |
| 2012/0289147 | A1* | 11/2012 | Raleigh | | H04L 67/2847 |
| | | | | | 455/3.06 |
| 2012/0310745 | A1 | 12/2012 | Bhatia et al. | | |
| 2013/0073336 | A1* | 3/2013 | Heath | | G06Q 30/02 |
| | | | | | 705/7.29 |
| 2013/0166445 | A1* | 6/2013 | Isaacson | | G06Q 30/0234 |
| | | | | | 705/41 |
| 2014/0025470 | A1* | 1/2014 | Berman | | G06Q 30/0235 |
| | | | | | 705/14.26 |
| 2014/0172504 | A1* | 6/2014 | Duva | | H04M 3/51 |
| | | | | | 705/7.31 |
| 2014/0379390 | A1 | 12/2014 | Scarborough | | |
| 2015/0120436 | A1* | 4/2015 | Duleba | | G06Q 30/0246 |
| | | | | | 705/14.45 |
| 2015/0207691 | A1* | 7/2015 | Price | | H04L 67/2847 |
| | | | | | 709/217 |
| 2015/0271557 | A1* | 9/2015 | Tabe | | H04N 21/4788 |
| | | | | | 725/14 |
| 2015/0310486 | A1* | 10/2015 | Hayes | | G06Q 30/0252 |
| | | | | | 705/14.5 |
| 2016/0034966 | A1* | 2/2016 | Maycotte | | G06Q 30/0269 |
| | | | | | 705/7.29 |
| 2016/0292299 | A1* | 10/2016 | Diwakar | | G06F 16/9024 |

\* cited by examiner

PROVIDING ON-DEMAND AUDIENCE BASED ON NETWORK

RELATED APPLICATION

This application is a continuation of U.S. patent application Ser. No. 14/465,377, filed Aug. 21, 2014, which is incorporated herein by reference.

BACKGROUND

Organizations often use marketing communications to inform or persuade an audience. The audience may be targeted so that marketing communications are more likely to reach an intended audience.

DETAILED DESCRIPTION OF PREFERRED EMBODIMENTS

The following detailed description of example implementations refers to the accompanying drawings. The same reference numbers in different drawings may identify the same or similar elements.

An organization deciding how and when to communicate with its target audience may consider numerous factors when evaluating the cost-benefit ratio of a marketing campaign. A business owner may wish to know how many potential customers are likely to see, and notice, an advertisement before deciding to launch a campaign. The campaign may also be subject to a time constraint, e.g., when relating to a holiday sale, election campaign, or perishable goods. Implementations described herein may assist an individual or organization in communicating with a quantified and engaged target audience within a time constraint.

Figure 1:
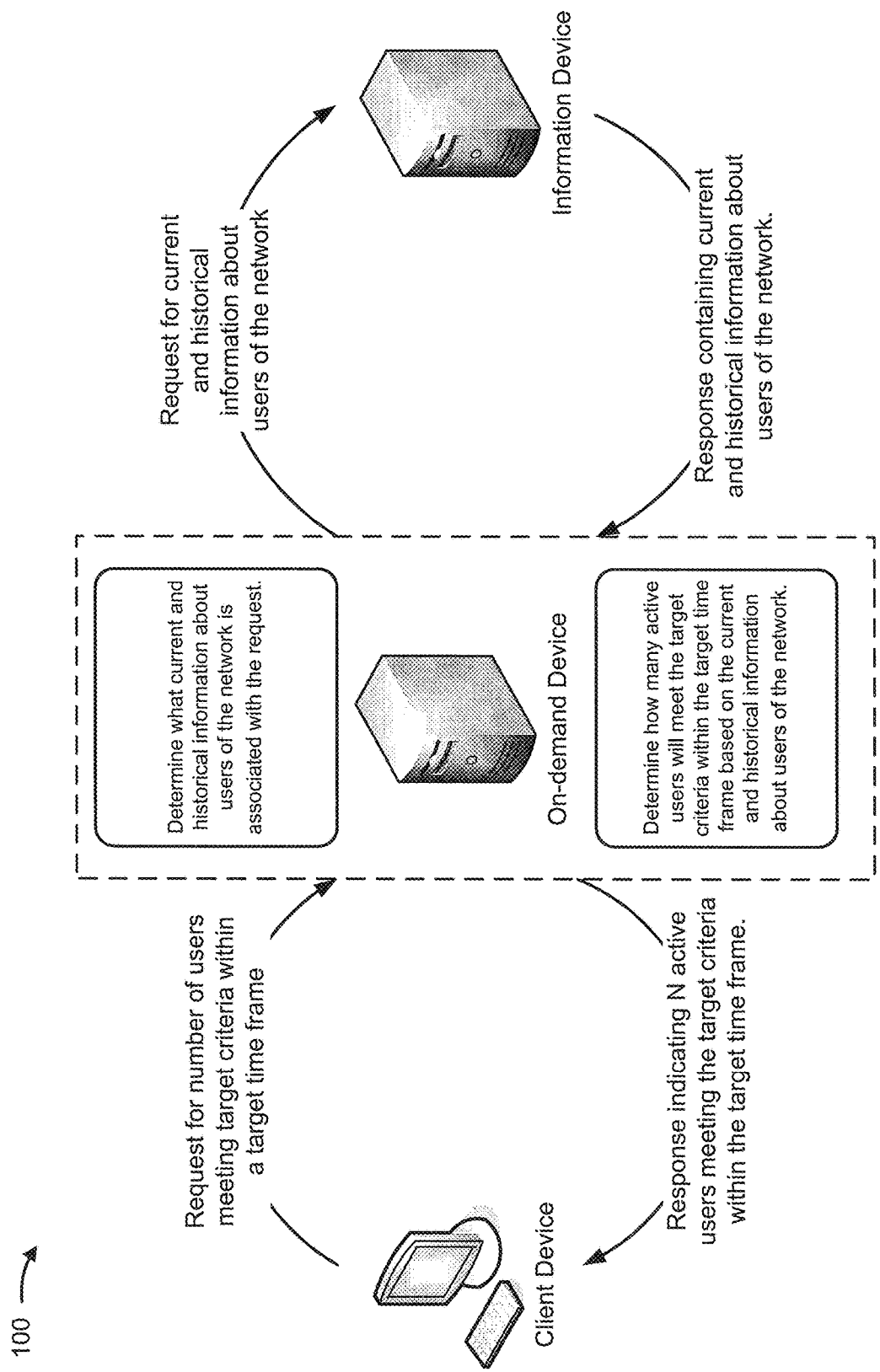
FIG. 1 is a diagram of an overview of an example implementation described herein.

FIG. 1 is a diagram of an overview of an example implementation 100 described herein. As shown in FIG. 1, example implementation 100 may include an on-demand device. Example implementation 100 may further include an information device and a client device, such as a computer, tablet, or smart phone. The client device may present information on a display, such as a screen or touch screen.

As shown in FIG. 1, the client device may send, to the on-demand device, a request for information identifying a quantity of users meeting target criteria within a target time frame. The on-demand device may determine, based on receiving the request from the client device, what current and historical information, associated with users of a network, may be relevant to the client's request. Based on this determination, the on-demand device may then send, to the information device, a request for relevant current and historical information about users of the network. Based on the request sent by the on-demand device, the information device may retrieve, from memory and/or the network, current and historical information associated with users of the network and may further send, to the on-demand device, a response including the retrieved current and historical information associated with users of the network. Based on the response, sent by the information device, the on-demand device may determine a level of association between users, who are and/or will be active within the target time frame, and the client's target criteria. Based on this determination, the on-demand device may send, to the client device, a response indicating the quantity of active users predicted to meet the target criteria within the target time frame. In this way, a potential advertiser may know, with some certainty, the quantity of potential customers to be reached within a certain time frame before sending a targeted marketing communication.

Figure 2:
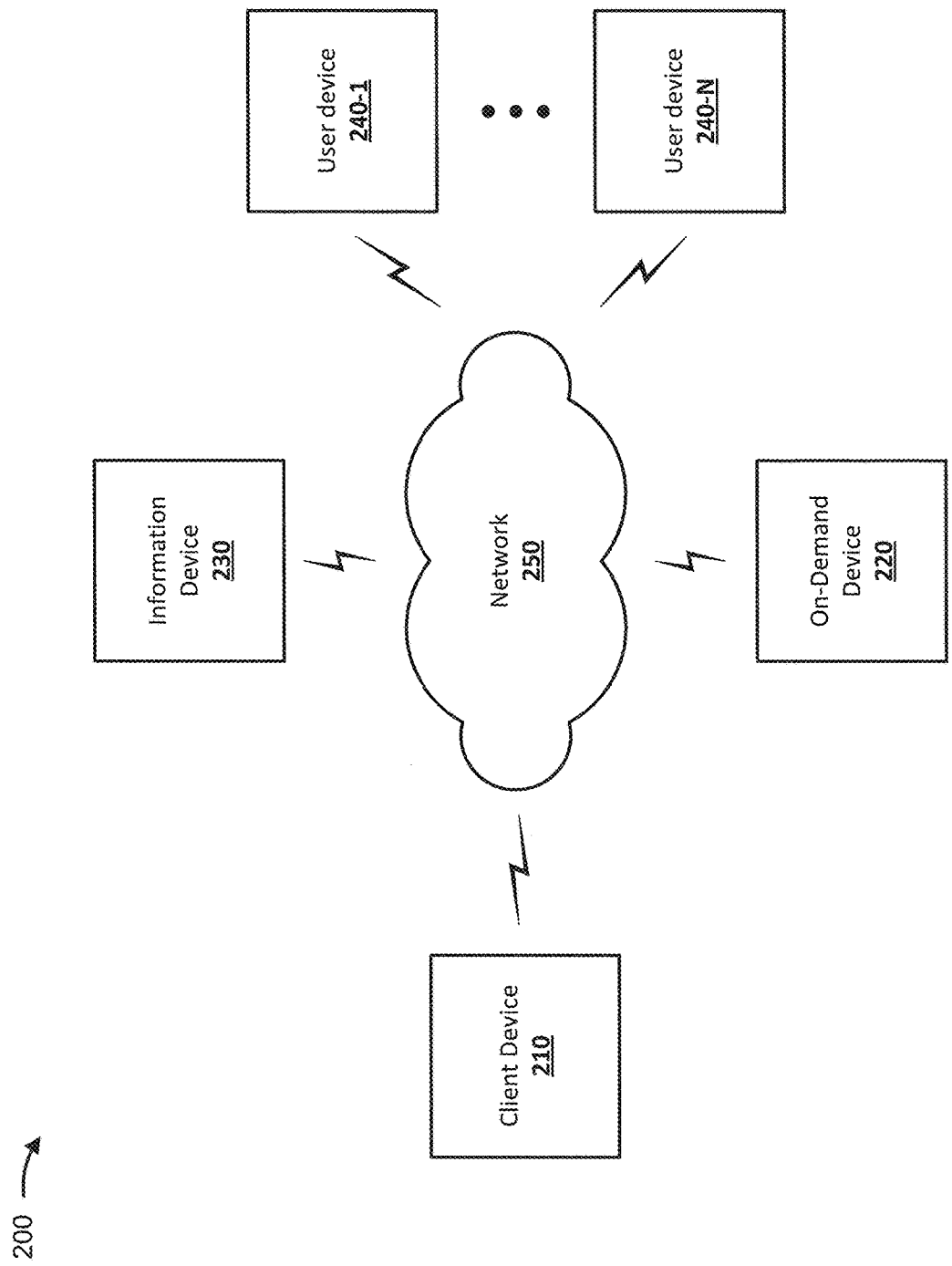
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an on-demand device 220, an information device 230, a group of user devices 240-1, . . . , 240-N (N≥1) (hereinafter referred to collectively as "user devices 240" and individually as "user device 240"), and a network 250. Devices of environment 200 may interconnect via wired connections, wireless connections, or a combination of wired and wireless connections.

Client device 210 may include a device capable of receiving, generating, storing, processing, and/or providing information for communicating requests to initiate a communication campaign. For example, client device 210 may include a communications and/or computing device, such as a mobile phone (e.g., a smart phone, a radiotelephone, etc.), a desktop computer, a laptop computer, a tablet computer, a handheld computer, a gaming device, or a similar device. In some implementations, client device 210 may receive information from and/or transmit information to another device in environment 200. For example, client device 210 may transmit a request to, and receive a response from, on-demand device 220, for initiating a communication campaign.

On-demand device 220 may include one or more devices capable of storing, processing, and/or routing information for receiving and processing network information to respond to communication campaign requests. For example, on-demand device 220 may include a server device or a collection of server devices. In some implementations, on-demand device 220 may include a communication interface that allows on-demand device 220 to receive information from and/or transmit information to other devices in environment 200. For example, on-demand device 220 may receive a request from, and transmit a response to, client device 210. Alternatively, or additionally, on-demand device 220 may transmit a request to, and receive a response from, information device 230.

User device 240 may include a device capable of receiving, generating, storing, processing, and/or providing information for generating network information and for receiving communications to effect a communications campaign. For example, user device 240 may include a communications and/or computing device, such as a mobile phone (e.g., a smart phone, a radiotelephone, etc.), a desktop computer, a laptop computer, a tablet computer, a handheld computer, a gaming device, or a similar device. In some implementations, user device 240 may receive information from and/or transmit information to another device in environment 200. For example, user device 240 may transmit user information, associated with user device 240, to information device 230 and may receive communications, associated with client device 210, from on-demand device 220.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
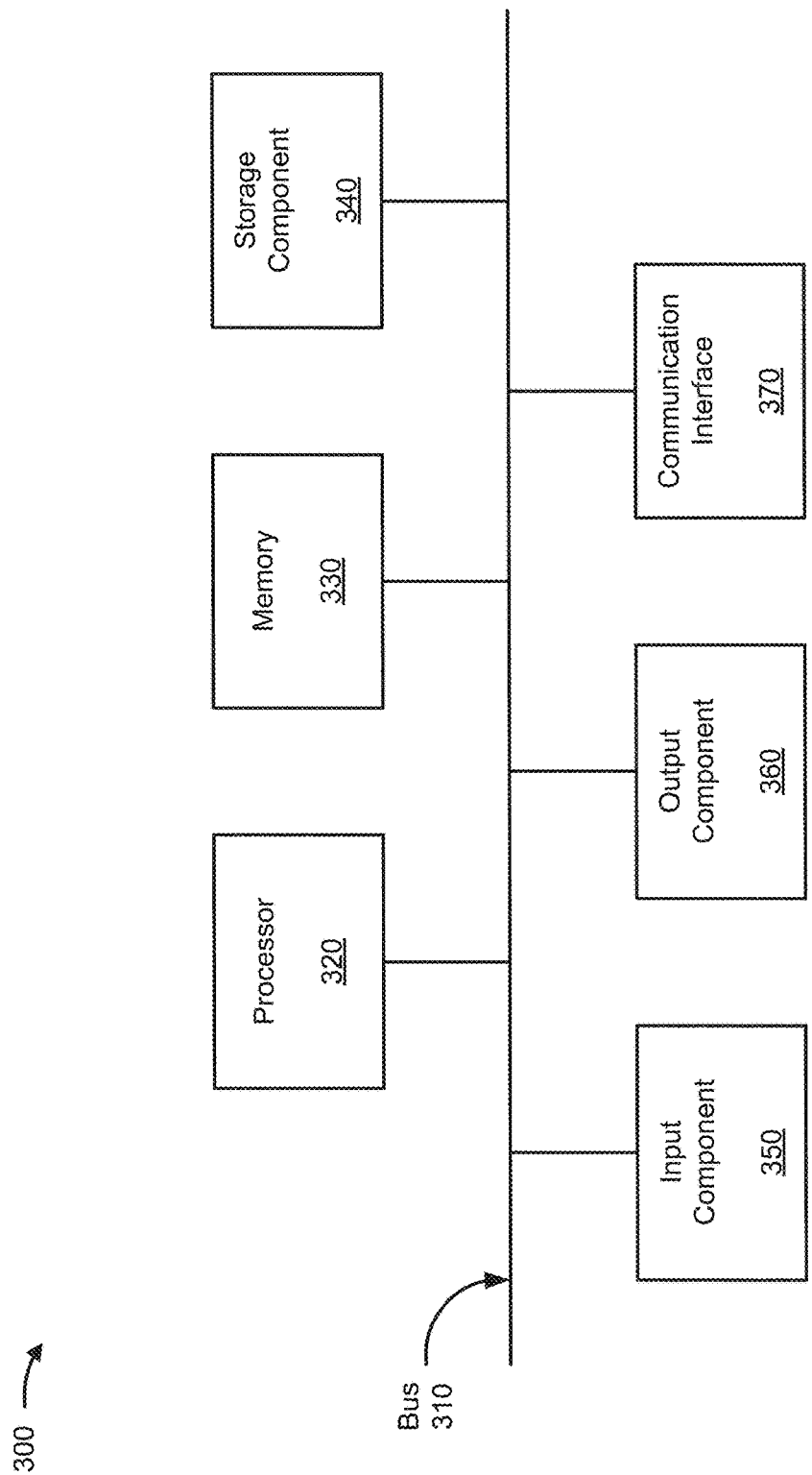
FIG. 3 is a diagram of example components of one or more devices of FIG. 2.

FIG. 3 is a diagram of example components of a device 300. Device 300 may correspond to client device 210, on-demand device 220, information device 230, and/or user device 240. In some implementations, client device 210, on-demand device 220, information device 230, and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
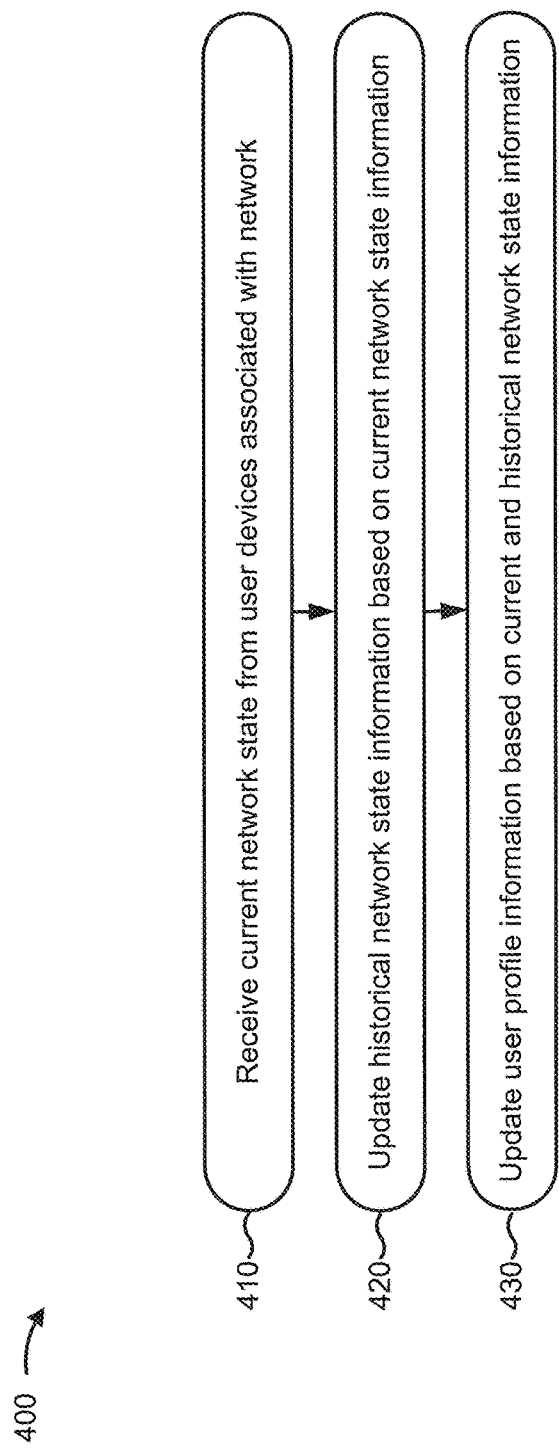
FIG. 4 is a flow chart of an example process for setting up an on-demand audience service.

FIG. 4 is a flow chart of an example process 400 for setting up an on-demand audience service. In some implementations, one or more process blocks of FIG. 4 may be performed by on-demand device 220. Additionally, or alternatively, one or more process blocks of FIG. 4 may be performed by another device or a group of devices separate from or including on-demand device 220, such as client device 210, information device 230, and/or user device 240.

As shown in FIG. 4, process 400 may include receiving current network state information from user devices associated with a network (block 410). For example, on-demand device 220 may receive the current network state information stored by information device 230, by, e.g., sending, to information device 230, a network state request and receiving, from information device 230, a network state response associated with the current network state information. Current network state information may include various information sent to/from and/or associated with a user device 240 and/or a user of a user device 240, such as, e.g., location information, message information, search information, purchase information, power state information, etc.

To respond to a network state request sent from on-demand device 220, information device 230 may collect information sent to/from and/or associated with user devices 240. Information device 230 may obtain this information by communicating with or more network devices of network 250. Information device 230 may collect this information on-demand (e.g., in response to a request from on-demand device 210), periodically (e.g., according to a schedule), based on a triggering event (e.g., when user device 240 logs onto network 250, sends/receives a message, initiates a purchase, relocates, changes power state, etc.), and/or in real time. Information device 230 may further store some or all of the collected information, as current network state information, in memory associated with information device 230.

Location information may include, e.g., a geographic location, orientation, velocity, etc., determined using, e.g., user device 240's network connectivity (e.g., a network address and/or proximity to a Wi-Fi network and/or cell tower) and/or a component of user device 240 (e.g., a global positioning system (GPS) receiver, accelerometer, gyroscope, etc.). On-demand device 210 may use location information, associated with a user device 240, to predict future location information and determine, based on a location target criterion, whether a user of user device 240 is and/or will be associated with a target audience.

Message information may include, e.g., content (e.g., text, image, sound, video, etc.) and/or metadata (e.g., a sender identifier, recipient identifier, time stamp, etc.), associated with a message, sent to/from user device 240 using, e.g., e-mail, short message service (SMS), multimedia message service (MMS), telephone, video conference, etc. On-demand device 220 may use message information, associated with a user device 240 and/or a user of user device 240, to predict a need and/or interest of the user and determine, based on a need/interest target criterion, whether the user is and/or will be associated with a target audience.

Search information may include, e.g., content (e.g., a search term, result, etc.) and/or metadata (e.g., a search engine identifier, time stamp, key words, description, quantity of time spent accessing a result, etc.), associated with a search query, sent to/from user device 240 including, e.g., a search for a resource located within and/or without memory/storage associated with user device 240 (e.g., performing a local file search, web-based search, and/or cloud-based search). On-demand device 220 may use search information, associated with user device 240 and/or a user of user device 240, to predict a need and/or interest of the user and determine, based on a need/interest target criterion, whether the user is and/or will be associated with a target audience.

Power state information may include, e.g., whether user device 240, or a component associated with user device 240 (e.g., a display), is currently on/off/idle. Alternatively, or additionally, power state information may include information associated with interaction between user device 240 and a user of user device 240 by, e.g., detecting user input or activities associated with user-interaction (e.g., playing audio and/or video), etc. On-demand device 220 may use power state information, associated with a user device 240, to predict whether the user is and/or will be likely to interact with user device 240 when, e.g., user device receives a communication from on-demand device 220.

As further shown in FIG. 4, process 400 may include updating historical network state information based on the current network state information (block 420). For example, on-demand device 220 and/or information device 230 may store historical user information based on, e.g., previously received network state information, described above with respect to block 410. On-demand device 220 and/or information device 230 may, e.g., append the current network state information to the historical network state information before, after, or concurrently with on-demand device 220's request for and/or receipt of current network state information from information device 230.

As further shown in FIG. 4, process 400 may include updating user profile information based on the current and historical network state information (block 430). For example, on-demand device 220 may use network state information, associated with a user device 240, to generate a user profile for a user associated with user device 240. On-demand device 220 may use, e.g., a statistical model, correlating network state information with characteristics associated with a user, to generate the user profile. Alternatively, or additionally, on-demand device 220 may generate the user profile based on input associated with a user, e.g., an explicit preference, opt-in, opt-out, etc. The user profile may include, e.g., a historical and/or current location, power state, need, interest, etc. associated with the user and/or user device 240. On-demand device 220 may use the user profile to predict, for a particular time and/or time range, whether a user is and/or will be associated with a target audience and/or likely to interact with a communication sent to user device 240.

Likewise, on-demand device 220 may generate and/or store a client profile associated with a client using client device 210. The client profile may include client characteristics and/or client target audience information which may be associated with characteristics included in a user profile (e.g., so that client profile characteristics may be compared to user profile characteristics to determine whether a user is associated with a client's target audience).

In this way, on-demand device 220 may set up an on-demand audience service for implementing, at the request of a client device 210, an on-demand communication campaign associated with a target audience.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
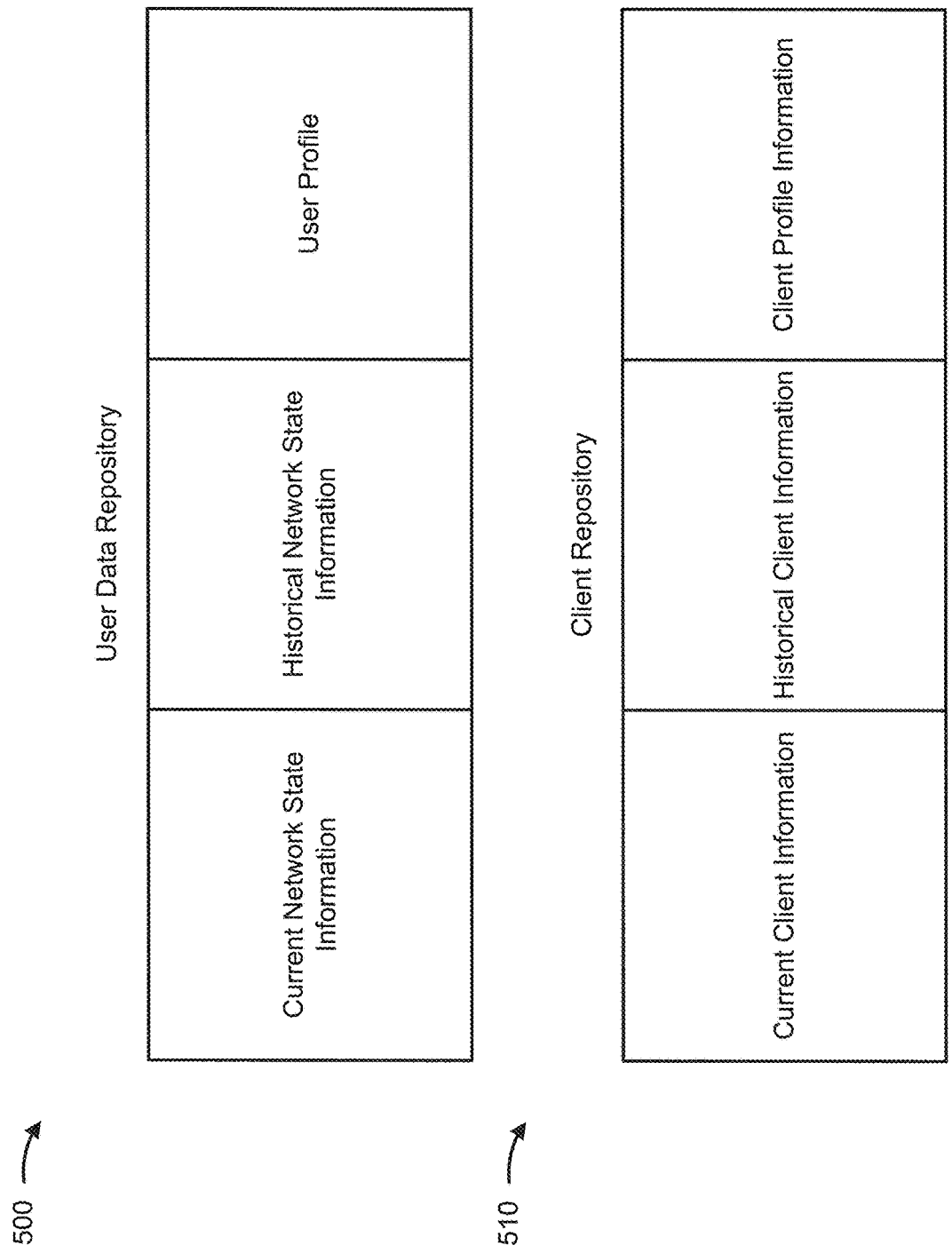
FIG. 5 is a diagram of an example data structure relating to the example process shown in FIG. 4.

FIG. 5 is a diagram of example data structures relating to the example process shown in FIG. 4. As shown in FIG. 5, process 400 may employ user data repository 500. For example, on-demand device 220 and/or information device 230 may store, as current data included in user data repository 500, current network state information associated with a user device 240 and/or a user of user device 240. The current data may include, e.g., the most recent location, message, web page request, power state, etc. of user device 240. The current data may be stored as, e.g., a list of values corresponding to characteristics included in the current network state information.

Alternatively, or additionally, on-demand device 220 and/or information device 230 may store, as historical data included in user data repository 500, historical network state information associated with a user device 240 and/or a user of user device 240. The historical data may include, e.g., a past location, message, web page request, power state, etc. of user device 240. The historical data may be stored as, e.g., a time-series of historical network states and/or a time series of characteristics included in the historical network state information.

Alternatively, or additionally, on-demand device 220 and/or or information device 230 may store, as profile data included in the user data repository 500, a user profile associated with the user of user device 240. The user profile may include information based on the current and/or historical network state information and/or information based on user input. As an example, current and historical data may include location information, associated with a user device 240, which describes a location of user device 240 at various times during a time period. Based on this location information, on-demand device 220 may determine where a user of user device 240 is likely to be at a particular time. Further, on-demand device 220 may infer other information about the user based on the location information, such as where the user lives or works, the user's preferred mode of transportation, schedule, etc. Likewise, on-demand device 210 may make determinations and/or inferences, based on other network state information, to generate a user profile.

On-demand device 220 may use information stored in the user data repository 500 to respond to a request from client device 210. Alternatively, or additionally, information device 230 may use information stored in the user data repository 500 to respond to a request from on-demand device 220. In this way, on-demand device 220 and/or information device 230 may use user data repository 500 to set up an on-demand audience service.

As also shown in FIG. 5, process 400 may employ client repository 510. For example, on-demand device 220 and/or information device 230 may store, as current data included in client repository 510, current client information associated with a client device 210 and/or a client associated with client device 210. The current data may include, e.g., the most recent location, message, web page request, power state, etc. of client device 210—similar to that described with respect to user data repository 500. Alternatively, or additionally, the current data may include information associated with a current and/or recent communication campaign (e.g., message content, a time constraint, target criteria, etc.). The current data may be stored as, e.g., a list of values corresponding to characteristics included in the current client information. On-demand device 220 may use the current client information to service current requests from a client device 210 to initiate and effect a communication campaign.

Alternatively, or additionally, on-demand device 220 and/or information device 230 may store, as historical data included in client repository 510, historical client information associated with a client device 210 and/or a client associated with client device 210. The historical data may include, e.g., a past location, message, web page request, power state, etc. of client device 210—similar to that described with respect to user data repository 500. Alternatively, or additionally, the historical data may include information associated with one or more past communication campaigns (e.g., message content, a time constraint, target criteria, etc.). The historical data may be stored as, e.g., a time-series of historical client information and/or a time series of characteristics included in the historical client information.

Alternatively, or additionally, on-demand device 220 and/or information device 230 may store, as profile data included in the client repository 510, client profile information associated with the client using client device 210. The client profile information may include information based on the current client information, historical client information, and/or information based on input (e.g., an explicit preference, target criterion, billing rate, etc.). As an example, current/historical data may include location information which identifies a location and/or a communication campaign associated with the client. Based on this location information, on-demand device 220 may determine a predicted target location criterion to be included in the client profile. Further, on-demand device 220 may infer other client profile information based on the current/historical information, such as identifying target criteria based on keywords in a message associated with a communication campaign. Likewise, on-demand device 210 may make determinations and/or inferences, based on other client information and/or based on information contained within the user data repository 500, to generate a client profile.

On-demand device 220 and/or information device 230 may use the current and historical client information to maintain a record of current/future requests, campaigns, etc. Alternatively, or additionally, on-demand device 220 may use the current/historical client information, and/or information included in the user data repository 500, to determine predicted client information associated with future requests, campaigns, etc. (e.g., by determining future target criteria and/or a future time constraint based on past target criteria, time constraint, network state information, user profiles, etc.). In this way, on-demand device 220 and/or information device 230 may use client repository 510 to set up an on-demand audience service.

Figure 6:
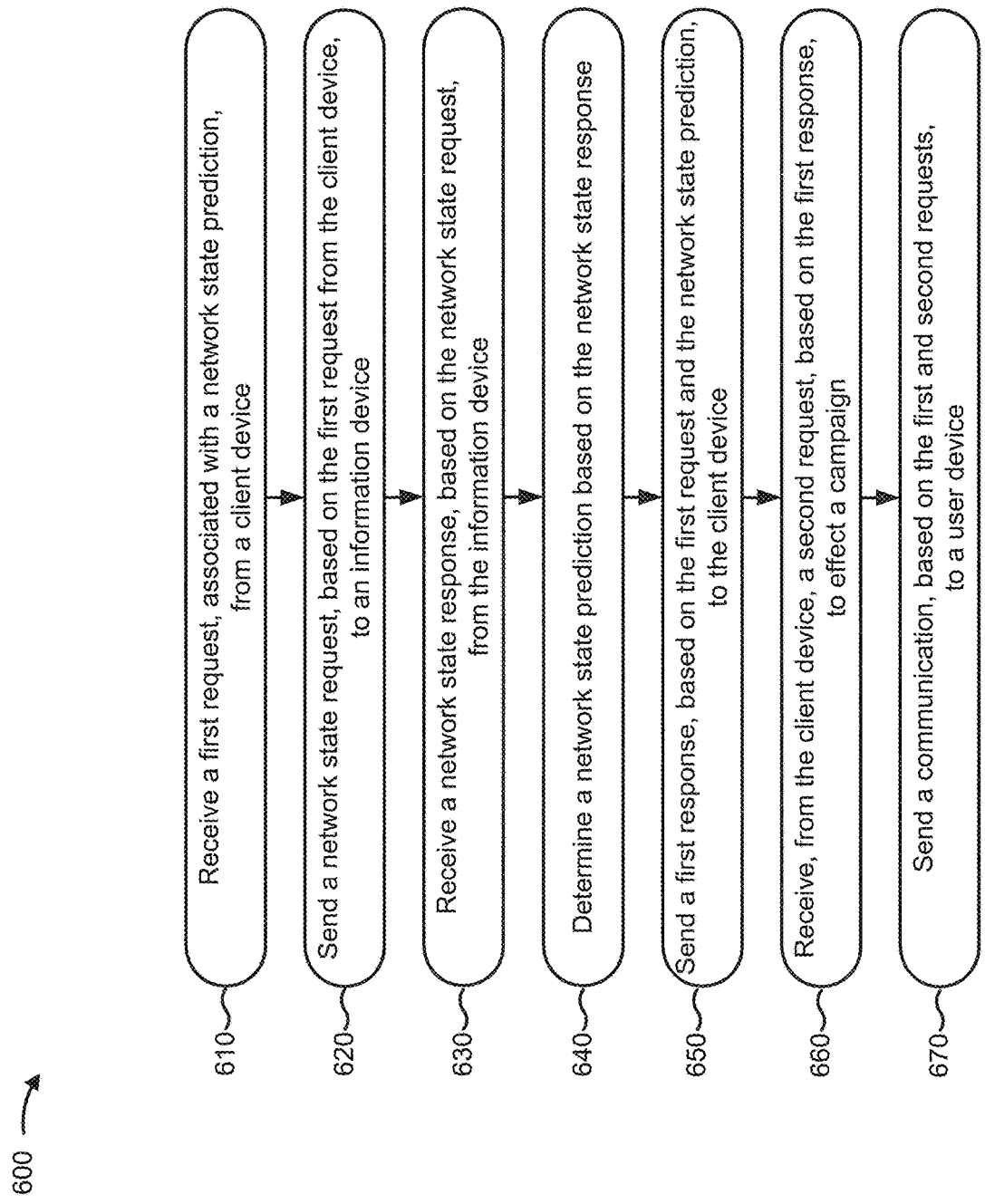
FIG. 6 is a flow chart of an example process for providing an on-demand audience service.

FIG. 6 is a flow chart of an example process 600 for providing an on-demand audience service. In some implementations, one or more process blocks of FIG. 6 may be performed by on-demand device 220. Additionally, or alternatively, one or more process blocks of FIG. 6 may be performed by another device or a group of devices separate from or including on-demand device 220, such as client device 210, information device 230, and/or user device 240.

As shown in FIG. 6, process 600 may include receiving a first request, associated with a network state prediction, from a client device (block 610). For example, client device 210 may send, to on-demand device 220, a first request to initiate a communication campaign, which may prompt on-demand device 220 to make a network state prediction. The first request may include and/or identify various information associated with a target audience. Information associated with a target audience may include various characteristics associated with members of the target audience, including, e.g., an age, gender, income, personal preference, location, activity history, habit, etc. Alternatively, or additionally, the first request may include and/or identify a time constraint. The time constraint may indicate a level of immediacy— e.g., within a certain number of minutes, hours, days, etc.—or the time constraint may indicate a time or time range in the future—e.g., a particular day, week, holiday, season, event, etc. The first request may also include other information that on-demand device 220 may use to determine information associated with a target audience and/or time constraint—e.g., by identifying information associated with client device 210 and/or content of a communication intended for the target audience.

As further shown in FIG. 6, process 600 may include sending a network state request, based on the first request from the client device, to an information device (block 620). For example, on-demand device 220 may send a network state request, requesting network state information associated with the first request, to information device 230. The requested network state information may identify various characteristics associated with user devices 240 and/or users of user devices 240, including, e.g., location information, message information, search information, purchase information, power state information, user profile information, or the like. The identified characteristics, included in the network state request, may serve as a first filter of information, stored by information device 230, by identifying network state information which is associated with the first request.

As further shown in FIG. 6, process 600 may include receiving a network state response, based on the network state request, from the information device (block 630). For example, on-demand device 220 may receive, from information device 230, a network state response, based on the network state request sent by on-demand device 220. The network state response may include some or all of the various characteristics, associated with user devices 240 and/or users of user devices 240, requested in the network state request (e.g., the network state information identified as being associated with the first request). Information device 230 may use information received, from user devices 240 and/or one or more other network devices associated with network 250, to generate the network state response. Additionally, or alternatively, information device 230 may also use previously stored information, received from user devices 240 and/or one or more devices associated with network 250, to generate the network state response.

As further shown in FIG. 6, process 600 may include determining a network state prediction based on the network state response (block 640). For example, on-demand device 220 may determine, based on the received network state response and the first request, a predicted network state for the time and/or time frame associated with the time constraint identified by the first request. On-demand device 220 may determine the predicted network state using, e.g., an empirical predictive model based on current and/or historical network state information, user profile data, and/or other information stored by information device 230. For example, on-demand device 220 may use a statistical model that describes relationships between target criteria and characteristics identified in network state information and/or user profile information. On-demand device 220 may use the model (e.g., by applying a regression analysis) to forecast the expected values of characteristics, associated with the target criteria, of user devices 240 for the time and/or time frame associated with the request.

The predicted network state may include various characteristics, associated with user devices 240 and/or users of user devices 240, that on-demand device 220 determines to be likely for the time and/or time frame associated with the time constraint identified by the first request. For example, based on current and historical location information contained within the network state response, on-demand device may determine, e.g., an expected trajectory and/or location of a user device 230 and/or a user of a user device 230 at a future time and/or time frame. As another example, based on current and historical search/browsing/purchase/message history information contained within the network state response, on-demand device may determine, e.g., an expected need and/or interest of a user of a user device 230 at a future time and/or time frame.

On-demand device 220 may also determine a confidence level for the network state prediction. The confidence level may indicate a level of certainty associated with the predictive model and/or predicted characteristics associated with the network state prediction. The confidence level may be expressed as, e.g., a numerical confidence value (e.g., a percentage, ratio, etc.), a confidence range (e.g., bounding values for a predicted value), a possible deviation value (e.g., a standard deviation or "plus or minus" value), and/or a limit (e.g., a minimum and/or worst-case predicted value) associated with a confidence level.

As further shown in FIG. 6, process 600 may include sending a first response, based on the first request and the network state prediction, to the client device (block 650). For example, on-demand device 220 may send, to client device 210, a first response indicating a quantity of users associated with the target audience, associated with a client using client device 210, and/or the time constraint. On-demand device 220 may, e.g., match user characteristics determined from the first request with user characteristics determined from the network state prediction, to determine a quantity of users associated with a target audience for the time and/or time frame associated with first request.

For example, on-demand device 220 may rank and/or qualify/quantify a correlation level associated with the matching of user characteristics between the first request and the network state prediction. Likewise, on-demand device 220 may determine the quantity, and/or confidence level, of users associated with the target audience by, e.g., determining whether a correlation level and/or rank, associated with a user, satisfies a threshold associated with a target criterion. For example, a predicted characteristic may be associated with a weighing factor, and on-demand device 220 may determine a rank and/or correlation level based on a sum of products of the predicted characteristics and their respective weighing factors. On-demand device 220 may send, with the first response, e.g., a histogram, or a quantity based on a histogram, associated with the identified quantity of users and their correlation level. The histogram may represent an estimate of a probability density function associated with characteristics included in the predicted network state.

The first response may also include other information including, e.g., an expiration time for the first response and/or pricing information associated with a communication sent to some or all of the users predicted to match the client's target audience. For example, on-demand device 220 may determine the expiration time based on the time and/or time frame associated with the first request. On-demand device 220 may determine pricing information based on various characteristics associated with the first request received from the client device 210 and/or based on other stored information.

As further shown in FIG. 6, process 600 may include receiving, from the client device, a second request, based on the first response, to effect a campaign (block 660). For example, on-demand device 220 may receive, from client device 210, a second request to effect a communication campaign. The second request may, e.g., indicate a quantity of users desired for the target audience. The second request may further include, e.g., a message (including, e.g., text, image, sound, etc.) for distributing to the identified target audience and/or information associated with billing (including, e.g., an account identifier, credit card information, etc.) a client associated with client device 210. Alternatively, or additionally, the second request may include some or all of the information included in the first request.

As further shown in FIG. 6, process 600 may include sending a communication, based on the first and second requests, to a user device (block 670). For example, on-demand device may send a message, included with the first and/or second request, to a quantity, identified in the first and/or second request, of recipient user devices 240 of network 250. On-demand device 220 may identify recipient user devices 240 based on matching between user characteristics determined from the first and/or second request with user characteristics determined from the predicted network state. Alternatively, or additionally, on-demand device 220 may send, to information device 230, another network state request and receive, from information device 230, another network state response to acquire current network state information. On-demand device 220 may then identify recipient user devices 240 based on matching between user characteristics determined from the first and/or second request with user characteristics determined from the current network state information received from information device 230. Users of user devices 240 may receive, from on-demand device 220, the message included in the first and/or second request, from client device 210, at the time and/or within the time frame identified by the time constraint identified by the first and/or second request. User devices 240 may send, to information device 230, feedback information associated with a user's receipt and/or response to the message from on-demand device 220. For example, information device 230 may receive, from user device 240, feedback information indicating, e.g., whether a user read, shared, deleted, etc. the message and/or whether the user performed an action associated with the message (e.g., purchasing a product, visiting a location/website, etc.).

In this way, a client using client device 210 may determine, prior to effecting a communications campaign, the quantity of users to be reached by the communication at and/or within a given time frame.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
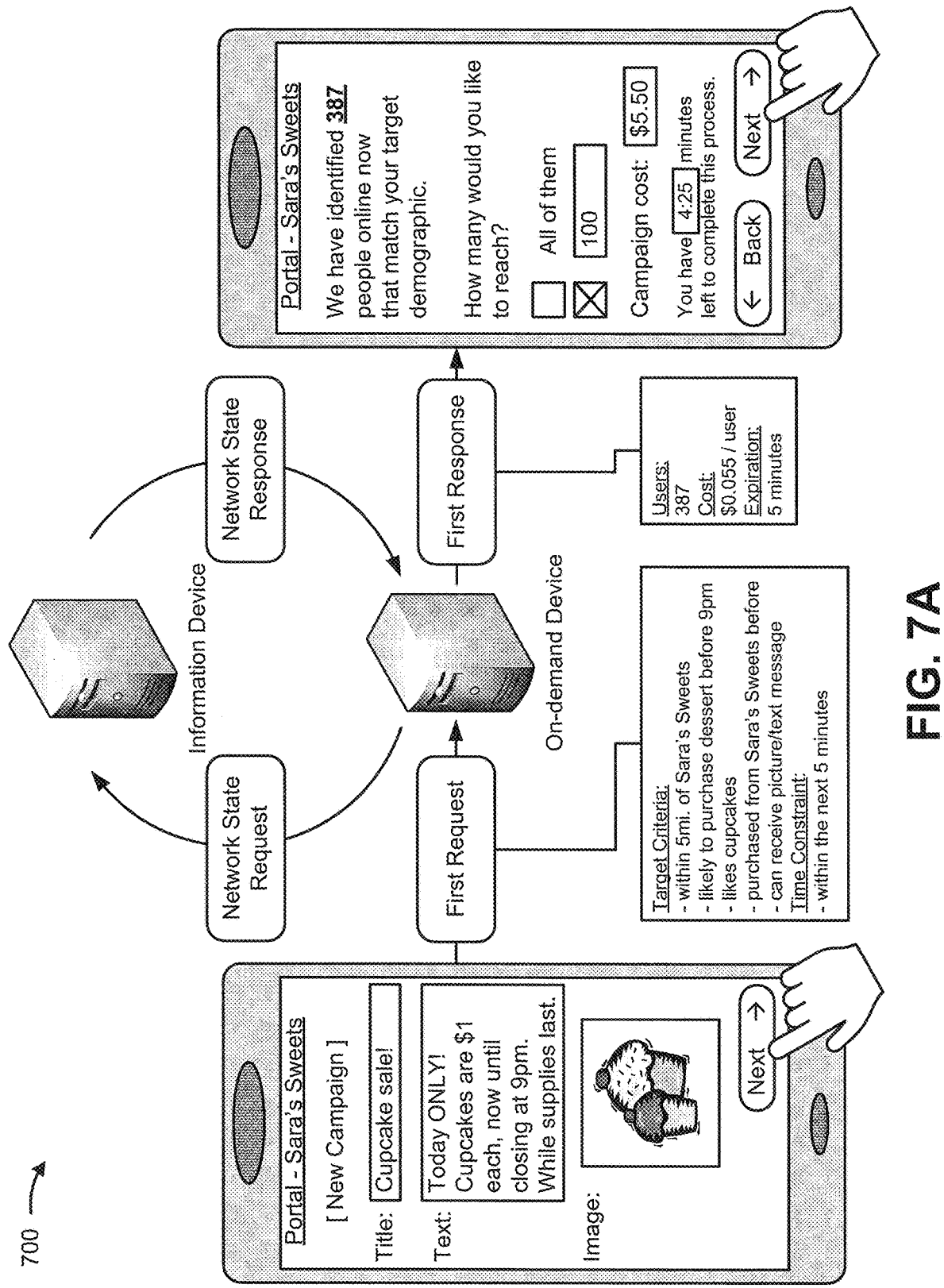
FIGS. 7A and 7B are diagrams of an example implementation relating to the example process shown in FIG. 6.
Figure 7B:
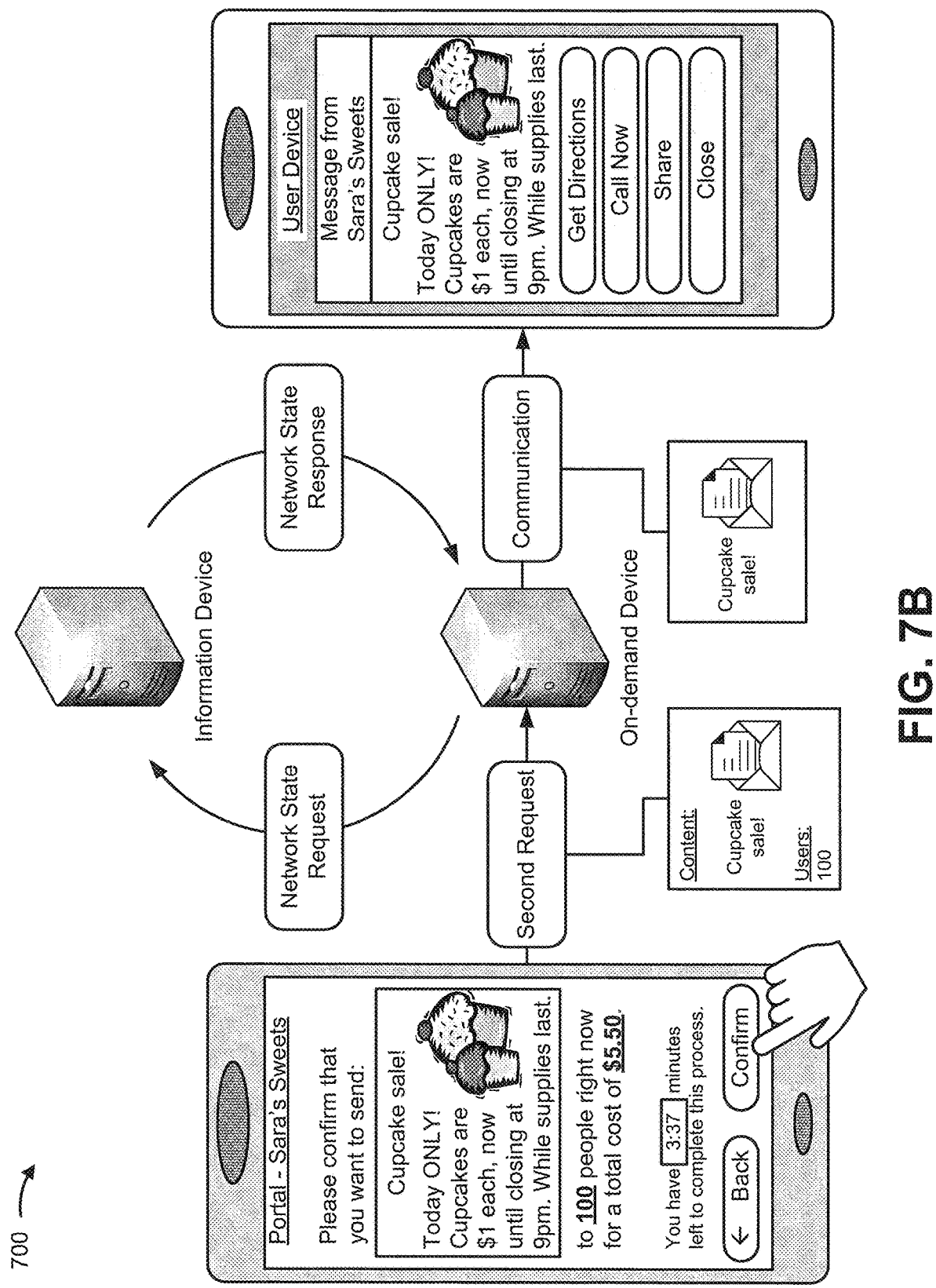

FIGS. 7A and 7B are diagrams of an example implementation 700 relating to example process 600 shown in FIG. 6 for providing an on-demand audience service. In example implementation 700, assume that a client, Sara (Sara's Sweets), has an excess inventory of cupcakes which must either be sold or discarded by the end of the day. Assume further that Sara wishes to send an immediate communication, offering to sell excess cupcakes at a discount, to one hundred potential customers.

As shown in FIG. 7A, assume, for example implementation 700, that Sara provides message input (using, e.g., an application or a portal) to her client device 210 for starting a new campaign. The message input may include a title ("Cupcake Sale!"), text ("TODAY ONLY! Cupcakes are $1 each, now until closing at 9 pm. While supplies last."), and/or an image (of, e.g., cupcakes). Sara's client device 210 may then generate a first request, based on Sara's input, and send the first request to an on-demand device 220. The first request may include information based on Sara's message input. Additionally, or alternatively, the first request may indicate target criteria for her audience (e.g., within five miles of Sara's Sweets, likely to purchase dessert before 9 pm, likes cupcakes, has purchased from Sara's Sweets in the past, is able to receive a message containing text/picture(s)) and/or a time constraint for sending the message input to users identified based on the target criteria (e.g., within the next five minutes). The target criteria and/or time constraint may be included in the first request, determined from the message input, and/or determined based on information, associated with Sara's Sweets, previously stored by Sara's client device 210 and/or on-demand device 220.

As further shown in FIG. 7A, assume, for example implementation 700, that on-demand device 220 received the first request, sent from Sara's client device 210. On-demand device 220 identifies, based on the message input, target criteria, and/or time constraint, network state information associated with the first request. For example, network state information (e.g., associated with the characteristic of being within five miles of Sara's Sweets) might include location information associated with user devices 240, such as GPS, network, Wi-Fi, etc. based location and accelerometer, gyroscope, etc. based velocity. As another example, network state information (e.g., associated with the characteristics of being likely to purchase dessert before 9 pm, liking cupcakes, and/or purchasing from Sara's Sweets in the past) might include user history, such as recent searches for food/drink, food and/or drink purchases, messages about food/drink, etc. Alternatively, or additionally, the identified network state information may include network/device activity of user device 240, such as an on/off/sleep state, user interaction level, connected/disconnected state, etc. for determining whether and/or when users are likely to be interacting with user devices 240 when a message is sent. The network state information request may also identify a time frame, based on the time constraint and/or other information included in the client's first request, associated with the requested network state information. For example, on-demand device 220 may identify a time frame of five minutes based on the Sara's desired immediacy for starting her campaign.

As further shown in FIG. 7A, assume, for example implementation 700, that on-demand device 220 receives, from information device, a network state response based on the network state request. For example, information device 230 may continuously or periodically collect information associated with network 250 and/or user devices 240 associated with network 250. Information device 230 may further use collected current and/or historical information to provide the user characteristic information requested by on-demand device in the network state request.

As further shown in FIG. 7A, assume, for example implementation 700, that on-demand device 220 sends, to Sara's client device 210, a first response, based on the network state response received from information device 230. The first response may contain a predicted quantity of users (e.g., 387) which match the target criteria, a cost associated with sending a message to users (e.g., $0.055 per user), and/or an expiration time for the prediction/cost (e.g., five minutes). The predicted quantity of users may be, e.g., a lower limit of a minimum guaranteed confidence interval. The cost may be based on information associated with Sara's Sweets (e.g., a pre-arranged billing agreement), information associated with the first request (e.g., the message content, target criteria, and/or time constraint), and/or predetermined information.

As further shown in FIG. 7A, assume, for example implementation 700, that Sara receives, using Sara's client device 210, the first response from on-demand device 220. Sara's client device 210 may display information associated with the first response (e.g., the predicted quantity of users, cost per user, time until expiration, etc.). Client device 210 may further provide for input to, e.g., confirm and/or modify information associated with the first response (e.g., to indicate a target audience of fewer than the predicted quantity of users). Assume that Sara provides input to Sara's client device 210 indicating that she wishes to send her message to one hundred users.

As shown in FIG. 7B, assume, for example implementation 700, that Sara's user device 210 sends, based on Sara's input and prior to the expiration time indicated by the first response, a second request to on-demand device 220 confirming her request to send her message, immediately, to one hundred users, for a total price of $5.50. The second request may contain a message based on the message input provided by Sara as well as the quantity of users Sara wishes to reach.

As further shown in FIG. 7B, assume, for example implementation 700, that on-demand device receives the second request. Based on the second request, on-demand device 220 may update the network state information by sending, to information device 230, another network state request and receiving, from information device 230, another network state response. Based on the network state information, received from information device 230, on-demand device 220 may identify users and/or user devices 240, associated with network 250, which match the target criteria. On-demand device may further send a communication, based on the message included in the first and/or second request, to some or all of the identified user devices 240, based on the first and/or second request (e.g., to the first 100 matching users or to the 100 highest-ranked matching users).

As further shown in FIG. 7B, assume, for example implementation 700, that each of the one hundred user devices 240 received, from on-demand device 220, the communication, containing the message. Each of user devices 240 may display the communication, or an indication that a communication is available to display, to users of user devices 240. The communication displayed may include the message as well as other information (e.g., directions to Sara's Sweets, an option to call Sara's Sweets, an option to share the communication, etc.).

As indicated above, FIGS. 7A and 7B are provided merely as an example. Other examples are possible and may differ from what was described with regard to FIGS. 7A and 7B.

Implementations described herein may assist a client in sending on-demand communications to a predicted quantity of users associated with a network within a particular time frame.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory storing instructions; and
one or more processors to execute the instructions to:
receive, at the device and from a client device associated with a user, a first request to initiate a communication campaign,
the communication campaign including information associated with target audience criteria and time information for sending a communication associated with the communication campaign,
the information associated with the target audience criteria including at least one of:
demographic information, or
activity history, and
the time information regarding a range of time;

send, from the device, to an information device, and based on receiving the first request to initiate the communication campaign, a second request for network state information regarding a state of a network,
the information device being different from the client device, and
the network state information including:
message information associated with user devices of the network,
the message information including at least one of message content sent to the user devices or message content sent from the user devices, and
search history information associated with at least one of one or more search queries sent to the user devices or one or more search queries sent from the user devices;
receive, at the device, from the information device, and based on the second request, a first response including:
user data associated with the user devices, and
the network state information;
determine, based on the first response, predicted network state information including predicted user data associated with the user devices and associated with the time information;
determine, based on the predicted network state information and the target audience criteria, a predicted quantity of the user devices satisfying the target audience criteria within the range of time;
send, from the device, to the client device, and based on determining the predicted quantity of the user devices, a second response including:
information indicating the predicted quantity of the user devices, and
information regarding a cost to send the communication to one or more recipient user devices associated with the predicted quantity of the user devices;
receive, at the device, from the client device, and based on sending the second response, a third request to effect the communication campaign,
the third request including a confirmation to send the communication to the one or more recipient user devices,
the one or more recipient user devices satisfying the target audience criteria; and
send the communication, from the device and based on receiving the third request, to the one or more recipient user devices.

2. The device of claim 1, where the one or more processors are further to:
determine a predictive model associated with predicting network state information; and
where the one or more processors, when determining the predicted network state information, are to:
determine the predicted network state information using the predictive model and the user data.

3. The device of claim 1, where the second response includes an expiration time for the information associated with the predicted quantity of the user devices included in the second response,
the expiration time indicating a time at which a prediction, associated with the predicted quantity of the user devices, expires.

4. The device of claim 1, where the one or more processors are further to:
determine current network state information; and
identify a set of recipient user devices based on the current network state information; and
where the one or more processors, when sending the communication to the one or more recipient user devices, are to:
send the communication to the identified set of recipient user devices.

5. The device of claim 1, where the one or more processors are further to:
determine, based on the user data, a predicted power state associated with one or more of the user devices; and
where the one or more processors, when determining the predicted quantity of the user devices, are to:
determine the predicted quantity of the user devices based on the predicted power state associated with the one or more of the user devices.

6. The device of claim 1, where the user data associated with the user devices includes information associated with at least one of:
a location of a user device of the user devices;
an e-mail message sent or received by the user device;
a text message sent or received by the user device;
a search query sent or received by the user device;
browsing activity of the user device;
a purchase initiated via the user device; or
a power state of the user device.

7. The device of claim 1, where the demographic information includes information associated with at least one of:
an age range of a target audience;
a gender of the target audience;
an income range of the target audience;
one or more personal preferences of the target audience; or
one or more habits of the target audience.

8. A non-transitory computer-readable medium storing instructions, the instructions comprising:
one or more instructions that, when executed by one or more processors of a device, cause the one or more processors to:
receive, at the device and from a client device associated with a user, a first request to initiate a communication campaign,
the communication campaign including information associated with target audience criteria and time information for sending a communication associated with the communication campaign,
the information associated with the target audience criteria including at least one of:
demographic information, or
activity history, and
the time information regarding a range of time;
send, from the device, based on the first request to initiate the communication campaign, and to one or more information devices associated with a network, a second request for network state information regarding a state of the network,
the one or more information devices being different from the client device, and
the network state information including:
message information associated with user devices of the network,
the message information including at least one of message content sent to the user devices or message content sent from the user devices, and search history information associated with at least one of one or more search queries sent to the user devices or one or more search queries sent from the user devices;
receive, at the device, from the one or more information devices and based on the second request, a first response including:
 user data associated with the user devices, and
 the network state information;
determine, based on the first response, predicted network state information associated with the user devices;
determine, based on the predicted network state information, a predicted quantity of the user devices satisfying the target audience criteria within the range of time;
send, from the device and to the client device, a second response based on the predicted quantity of the user devices to permit the communication campaign to be initiated,
 the second response including:
  an indication of the predicted quantity of the user devices, and
  cost information associated with initiating the communication campaign;
receive, at the device, from the client device, and based on sending the second response, a third request to effect the communication campaign,
 the third request including a message for one or more recipient user devices that match the target audience criteria; and
send, from the device, the message to the one or more recipient user devices identified in the second request.

9. The non-transitory computer-readable medium of claim 8, where the one or more instructions, when executed by the one or more processors, further cause the one or more processors to:
determine a predictive model associated with predicting network state information; and
where the one or more instructions, that cause the one or more processors to determine the predicted network state information, cause the one or more processors to:
determine the predicted network state information using the predictive model and the network state information.

10. The non-transitory computer-readable medium of claim 8, where the cost information indicates a cost to send the message to the one or more recipient user devices.

11. The non-transitory computer-readable medium of claim 8, where the one or more instructions, when executed by the one or more processors, further cause the one or more processors to:
determine current network state information; and
identify a set of recipient user devices based on the current network state information; and
where the one or more instructions, that cause the one or more processors to send the message to the one or more recipient user devices, cause the one or more processors to:
send the message to the identified set of recipient user devices.

12. The non-transitory computer-readable medium of claim 8, where the one or more instructions, when executed by the one or more processors, further cause the one or more processors to:
determine, based on the network state information, a predicted power state associated with one or more of the user devices; and
where the one or more instructions, that cause the one or more processors to determine the predicted quantity of the user devices, cause the one or more processors to:
determine the predicted quantity of the user devices based on the predicted power state associated with the one or more of the user devices.

13. The non-transitory computer-readable medium of claim 8, where the first response includes information associated with at least one of:
a location of a user device of the user devices;
an e-mail message sent or received by the user device;
a text message sent or received by the user device;
a search query sent or received by the user device;
browsing activity of the user device;
a purchase initiated via the user device; or
a power state of the user device.

14. The non-transitory computer-readable medium of claim 8, where the network state information further includes at least one of:
location information,
purchase information,
power state information, or
user profile information.

15. A method comprising:
receiving, by a device and from a client device associated with a user, a first request to initiate a communication campaign,
 the communication campaign including information associated with target audience criteria and information associated with time information for sending a communication associated with the communication campaign,
  the information associated with the target audience criteria including at least one of:
   demographic information, or
   activity history, and
  the time information regarding a range of time;
sending, by the device and to an information device based on receiving the first request to initiate the communication campaign, a second request for network state information regarding a state of a network,
 the information device being different from the client device, and
 the network state information including:
  message information associated with user devices of the network,
   the message information including at least one of message content sent to the user devices or message content sent from the user devices, and
  search history information associated with at least one of one or more search queries sent to the user devices or one or more search queries sent from the user devices;
receiving, by the device, from the information device, and based on the second request, a first response including:
 user data associated with the user devices, and
 the network state information;
determining, by the device and based on the first response, predicted network state information including predicted user data associated with the user devices and the time information,
 the predicted user data including predicted location information associated with the user devices;

determining, by the device and based on the predicted network state information and the target audience criteria, a predicted quantity of the user devices satisfying the target audience criteria within the range of time; and sending, by the device, a second response to the client device based on determining the predicted quantity of the user devices, the second response including:

information indicating the predicted quantity of the user devices, and cost information associated with sending a message to one or more recipient user devices;

receiving, by the device, from the client device, and based on sending the second response, a third request to effect the communication campaign, the third request including the message for the one or more recipient user devices, the one or more recipient user devices matching the target audience criteria; and sending, by the device, the message to the one or more recipient user devices.

16. The method of claim 15, further comprising:

determining a predictive model associated with predicting network state information; and where determining the predicted network state information comprises:

determining the predicted network state information using the predictive model and the user data.

17. The method of claim 15, where the second response includes:

an expiration time for the information associated with the predicted quantity of the user devices, the expiration time indicating a time at which a prediction, associated with the predicted quantity of the user devices, expires.

18. The method of claim 15, further comprising:

determining current network state information; and identifying a set of recipient user devices based on the current network state information; and where sending the message to the one or more recipient user devices comprises:

sending the message to the identified set of recipient user devices.

19. The method of claim 15, further comprising:

determining, based on the user data, a predicted power state associated with one or more of the user devices; and where determining the predicted quantity of the user devices comprises:

determining the predicted quantity of the user devices based on the predicted power state associated with the one or more of the user devices.

20. The method of claim 15, further comprising:

determining expected trajectories or locations of the user devices based on the network state information; and where determining the predicted quantity of the user devices satisfying the target audience criteria within the range of time comprises:

determining, based on the expected trajectories or locations of the user devices, the predicted quantity of the user devices satisfying the target audience criteria within the range of time.

* * * * *